United States Patent
Morales et al.

(10) Patent No.: US 7,812,997 B2
(45) Date of Patent: *Oct. 12, 2010

(54) JOB GANGING VIA AUTOMATIC PROPORTIONAL CONCATENATION

(75) Inventors: Javier A. Morales, Rochester, NY (US); Heidi O. Thatcher, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 1263 days.

This patent is subject to a terminal disclaimer.

(21) Appl. No.: 11/364,258

(22) Filed: Feb. 28, 2006

(65) Prior Publication Data

US 2007/0201045 A1    Aug. 30, 2007

(51) Int. Cl.
- G06F 3/12 (2006.01)
- G06F 15/00 (2006.01)
- G06F 15/76 (2006.01)
- G06K 15/02 (2006.01)
- G06K 1/00 (2006.01)
- G06T 1/00 (2006.01)
- H04N 1/387 (2006.01)
- H04N 1/00 (2006.01)

(52) U.S. Cl. .................. 358/1.18; 358/1.1; 358/2.1; 358/1.9; 358/400

(58) Field of Classification Search .................. 358/1.1, 358/1.9, 1.15, 1.18, 2.1; 715/246, 251, 253
See application file for complete search history.

(56) References Cited

U.S. PATENT DOCUMENTS

| | | | | |
|---|---|---|---|---|
| 4,951,233 A * | 8/1990 | Fujiwara et al. | ............. | 715/209 |
| 5,450,571 A * | 9/1995 | Rosekrans et al. | ............. | 703/24 |
| 5,615,015 A * | 3/1997 | Krist et al. | ................... | 358/296 |
| 6,650,433 B1 * | 11/2003 | Keane et al. | ................ | 358/1.15 |
| 7,092,963 B2 * | 8/2006 | Ryan et al. | ................ | 707/104.1 |
| 7,133,149 B2 * | 11/2006 | Keane et al. | ................ | 358/1.15 |
| 7,177,045 B2 * | 2/2007 | Goel et al. | ................. | 358/1.18 |
| 2007/0291309 A1 * | 12/2007 | Kurimura | ................... | 358/1.18 |
| 2008/0144081 A1 * | 6/2008 | Morales et al. | ............. | 358/1.15 |
| 2008/0264285 A1 * | 10/2008 | Morales | ...................... | 101/483 |
| 2008/0265482 A1 * | 10/2008 | Morales | ................... | 270/52.02 |
| 2009/0033977 A1 * | 2/2009 | Morales et al. | ............. | 358/1.15 |
| 2009/0033978 A1 * | 2/2009 | Morales | .................... | 358/1.15 |
| 2009/0033979 A1 * | 2/2009 | Morales et al. | ............. | 358/1.15 |

* cited by examiner

Primary Examiner—Twyler L Haskins
Assistant Examiner—Myles D Robinson
(74) Attorney, Agent, or Firm—Luis M. Ortiz; Kermit D. Lopez; Kevin L. Soules

(57) ABSTRACT

A number of different print jobs having different print quantities can be combined into a single job that results in reduced bindery costs. An imposition is produced with the print patterns for the different print jobs in different print positions. Jobs with larger print quantities can occupy a greater number of print positions. The allocation of print positions among the different print jobs can be based on quantity ratios. A print job having twice the quantity of another should occupy twice the number of print positions. Proper allocation of print positions results in maximizing the number of sheets that can be printed with a single imposition. Maximizing the number of identically printed sheets results in reduced bindery costs.

20 Claims, 7 Drawing Sheets

JOB GANGING VIA AUTOMATIC PROPORTIONAL CONCATENATION

TECHNICAL FIELD

Embodiments relate to printing cutting, and binding documents. Embodiments also relate to the printing imposition process.

BACKGROUND

A marking engine, or printer, is a device that receives a job and produces printed output. A bindery is a device that transforms printed output into printed product. For example, a pamphlet can be produced by printing the individual pages, collating them, and then binding them. Many printers print onto sheets that are then cut into individual pages. For example, United States currency is printed in sheets with each sheet having 32 pieces of currency. The bindery cuts the sheets into separate bills.

FIG. 6, labeled as "prior art", illustrates a sheet 600 with eight different printing positions. After printing, the sheet 600 can be cut into eight units. The different print positions can contain the same printing pattern or can contain different printing patterns. For example, print position 1 601, print position 2 602, print position 3 603 and print position 4 604 can all contain a first printing pattern. Print position 5 605 and print position 6 606 can have a second printing pattern. Print position 7 607 can have a third printing pattern and print position 8 608 can have no printing pattern. Printing and cutting 500 sheets results in 2000 pages of print pattern 1, 1000 pages of print pattern 2, 500 pages of print pattern 3, and 500 pages of waste.

FIG. 7, labeled as "prior art", illustrates a sheet 700 with three different printing positions. After printing, the sheet 700 can be cut into three units. Print position 1 701 is much larger than the other print positions. Print position 2 702 and print position 3 703 are the same size. As such, print position 1 701 can contain a large printing pattern while print position 2 702 and print position 3 703 can each contain the same small printing pattern. Printing and cutting 500 sheets results in 500 pages of the large printing pattern and 1000 pages of the smaller printing pattern.

The specific print patterns and where they are printed onto a sheet is called an imposition. The printer in the previous examples printed 500 sheets using each imposition. The printer does not need to be aware of how many or which printing patterns are present in an imposition. The bindery, however, does know. The bindery cuts the sheets and collects them to produce the different quantities of different printed product.

Historically, imposition referred to the process of setting up printing plates that were then used to print sheets. A person made the imposition by assembling the different print jobs and setting up the plates. Many modern printers use a xerographic process instead of printing plates. The imposition is transferred onto a plate or drum having an electrostatic charge over a photoreceptive surface. A light beam, such as a laser beam, selectively discharges the electrostatic charge to produce the imposition. An imposition is still produced, but in a far more efficient manner.

Modern imposition processes are automated to some level. Some processes are fully automated while others are partially automated. FIG. 6 presents an imposition where every printing pattern is the same size while FIG. 7 presents an imposition with different sized printing patterns. Systems and methods for creating impositions from like sized and differently sized printing patterns are known to those skilled in the arts of imposition, printing, and imposition algorithms.

Regardless of the efficiency obtained in producing the imposition, the efficiency of the bindery is unaffected. When given a set of jobs, a person chooses an imposition. Some impositions minimize bindery costs while others do not. As discussed above, cutting is a bindery operation. Sheets are cut in stacks. Cutting a stack of 500 sheets can cost nearly the same amount as cutting a stack of 10 sheets. Stacking sheets having different impositions is not a good solution because separating different products that are stacked together can be difficult and error prone. As such, systems and methods for creating impositions that allow for stacking large numbers of identical sheets without causing excessive waste are needed.

BRIEF SUMMARY

Aspects of the embodiments address limitations and flaws in the prior art by automatically combining print jobs to produce a single job having an imposition that reduces bindery costs.

It is therefore an aspect of the embodiments to obtain ganging criteria. Ganging criteria govern the properties that a group of print jobs must meet so that they can be combined. For example, a substrate specification is an excellent ganging criterion because it specifies the properties of the sheet that is printed on. The imposition causes all the print jobs to be printed onto the same sheet but in different print positions. Another example of a ganging criterion is marking solution color. Inks, dyes, and pigments are different types of marking solution. Combining print jobs with similar, or the same, color requirements can result in an imposition that is easier or less expensive to print than one with more dissimilar color requirements. Possible reasons are that the marking engine may lay down each color in a different processing step or that the printing facility has special "color days". A "color day" is used to minimize changing between different marking solutions and thereby minimizing down time and related costs.

A ganging criterion based on quantity ratios can also be used. Every print job has a quantity. The quantity ratio between two print jobs indicates the relative sizes of two print jobs. For example, a quantity ratio of 500 indicates that one job is 500 times larger than the other. It is rarely cost effective to gang jobs with such a remarkable size disparity. As such, a maximum quantity ratio can be used as a ganging criterion.

It is another aspect of the embodiments to obtain at least two print jobs. Every print job has a page size and a quantity. All the obtained print jobs can have the same page size although they can have different quantities. The ganging criteria can be used to produce a combinable job set from the print jobs. All the print jobs in the combinable job set must meet the ganging criteria.

It is yet another aspect of the embodiments to determine the number of print positions in an imposition. The number of print positions is the number of print jobs that can be accommodated in the imposition. The size of the imposition is known and the page size of the print jobs in the combinable job set is known. The number of print positions is known. The variable "P" denotes the number of print positions.

It is also an aspect of the embodiments to determine the quantity ratios of the jobs in the combinable job set and to use the quantity ratios to determine an imposition pattern. The imposition pattern contains one or more print jobs. The imposition pattern is then used to guide combining print jobs into a single ganged job. Systems and methods for combining print jobs into a ganged job are known by those skilled in the art of printing imposition. They do not, however, know of automatic systems and methods for choosing an imposition to minimize bindery costs.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DETAILED DESCRIPTION OF THE INVENTION

The particular values and configurations discussed in these non-limiting examples can be varied and are cited merely to illustrate embodiments and are not intended to limit the scope of the invention.

Figure 1:
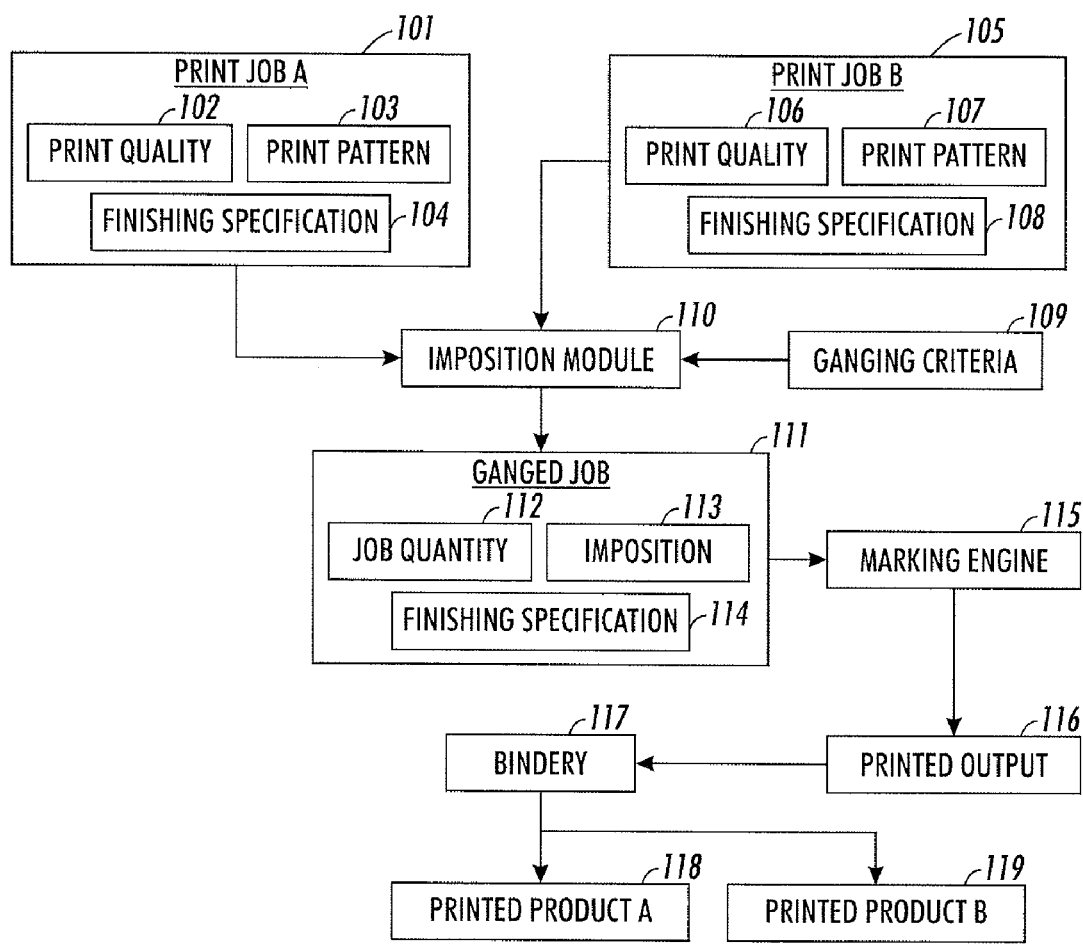
FIG. 1 illustrates a high level block diagram of a system that can use ganging criteria to combine print jobs into a single imposition and use that imposition to produce printed product in accordance with aspects of the embodiments.

FIG. 1 illustrates a high level block diagram of a system that can use ganging to combine print jobs into a single imposition and use that imposition to produce printed product in accordance with aspects of the embodiments. Print job A 101 has a print quantity 102, print pattern 103, and finishing specification 104. Print job B 105 also has a print quantity 106 print pattern 107 and finishing specification 108. A print quantity is how many printed pages are desired. A print pattern is what should actually appear on the printed page. A finishing specification specifies a number of things such as the material to be printed on and the page size.

An imposition module 110 obtains print jobs and ganging criteria 109 and uses them to produce a ganged job 111. The ganged job 111 is similar to a print job in that it has a job quantity 112 and finishing specification 114. Instead of a print pattern, the ganged job 111 has an imposition 113. In reality, the imposition is a print pattern. The difference is that the imposition is the pattern printed onto a sheet that can have many print positions while a print pattern is the pattern to be printed at a single print position. The marking engine 115 accepts the ganged job 111 to produce printed output 116.

As discussed above, the printed output 116 is a stack of identically printed sheets. Each sheet is printed with the imposition. The bindery 117 accepts the printed output 116 and produces printed product A 118 and printed product B 119. For example, the printed output can be 1,000 sheet of U.S. currency with 32 bills per sheet. The printed product is 32,000 bills. Note that U.S. currency is printed with an additional step of adding a unique serial number to each bill.

Figure 2:
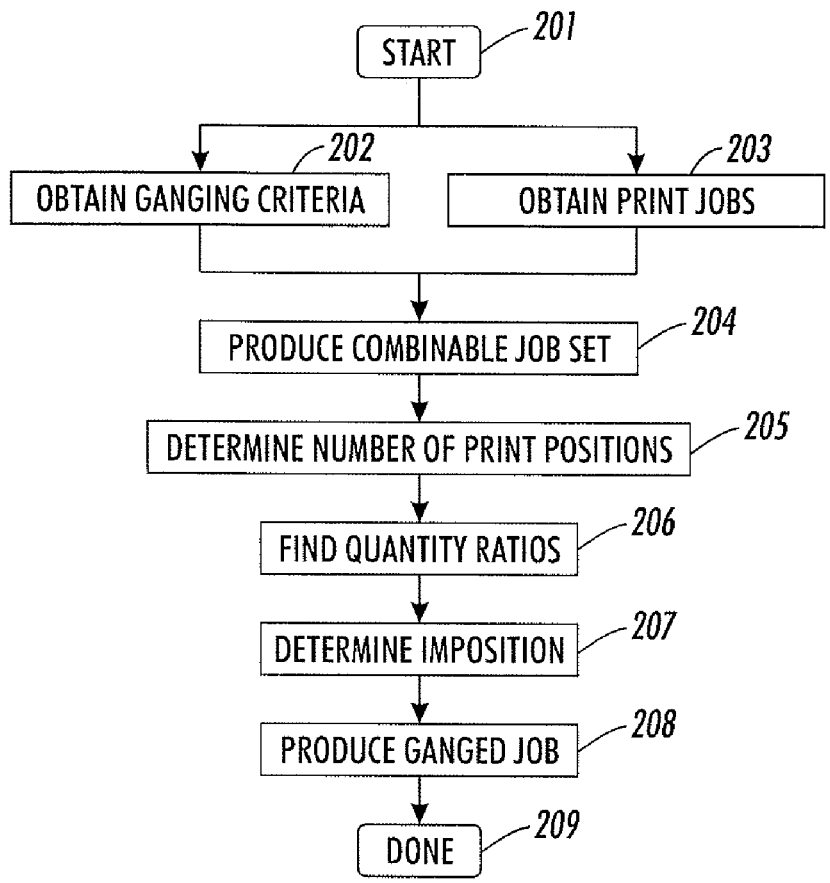
FIG. 2 illustrates a high level flow diagram of producing a ganged job in accordance with aspects of certain embodiments.

FIG. 2 illustrates a high level flow diagram of producing a ganged job in accordance with aspects of certain embodiments. After the start 201 ganging criteria are obtained 202 and print jobs are obtained 203. A combinable job set 204 is produced by applying the ganging criteria to the print jobs. The number of print positions is determined 205 based on the size of the imposition and the page size of the print jobs. In most cases, standard page sizes are used and the number of print positions and their location in an imposition is known in advance. The quantity ratios are found 206 and used to determine the imposition 207. A ganged job is produced 208 using the determined imposition and the jobs in the combinable job set. Finally, the process is done 209.

Figure 3:
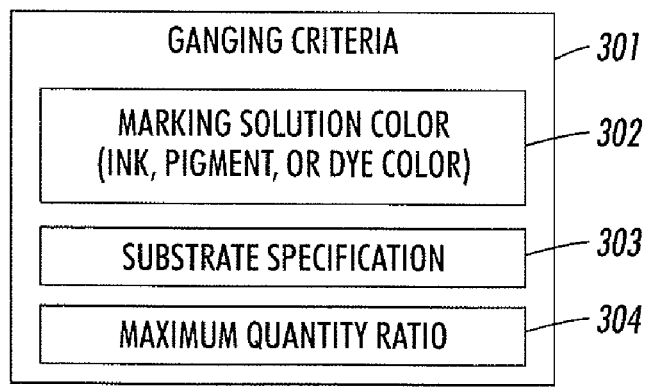
FIG. 3 illustrates ganging criteria in accordance with aspects of some embodiments.

FIG. 3 illustrates ganging criteria 301 in accordance with aspects of the embodiments. Marking solution color 302 can be a ganging criterion. As discussed above, inks, pigments, and dyes are marking solutions. Another ganging criterion can be the substrate specification 303 which specifies the type of paper or other material that is to be printed onto. Also as discussed above, the maximum quantity ratio 304 can be a ganging criterion.

Figure 4:
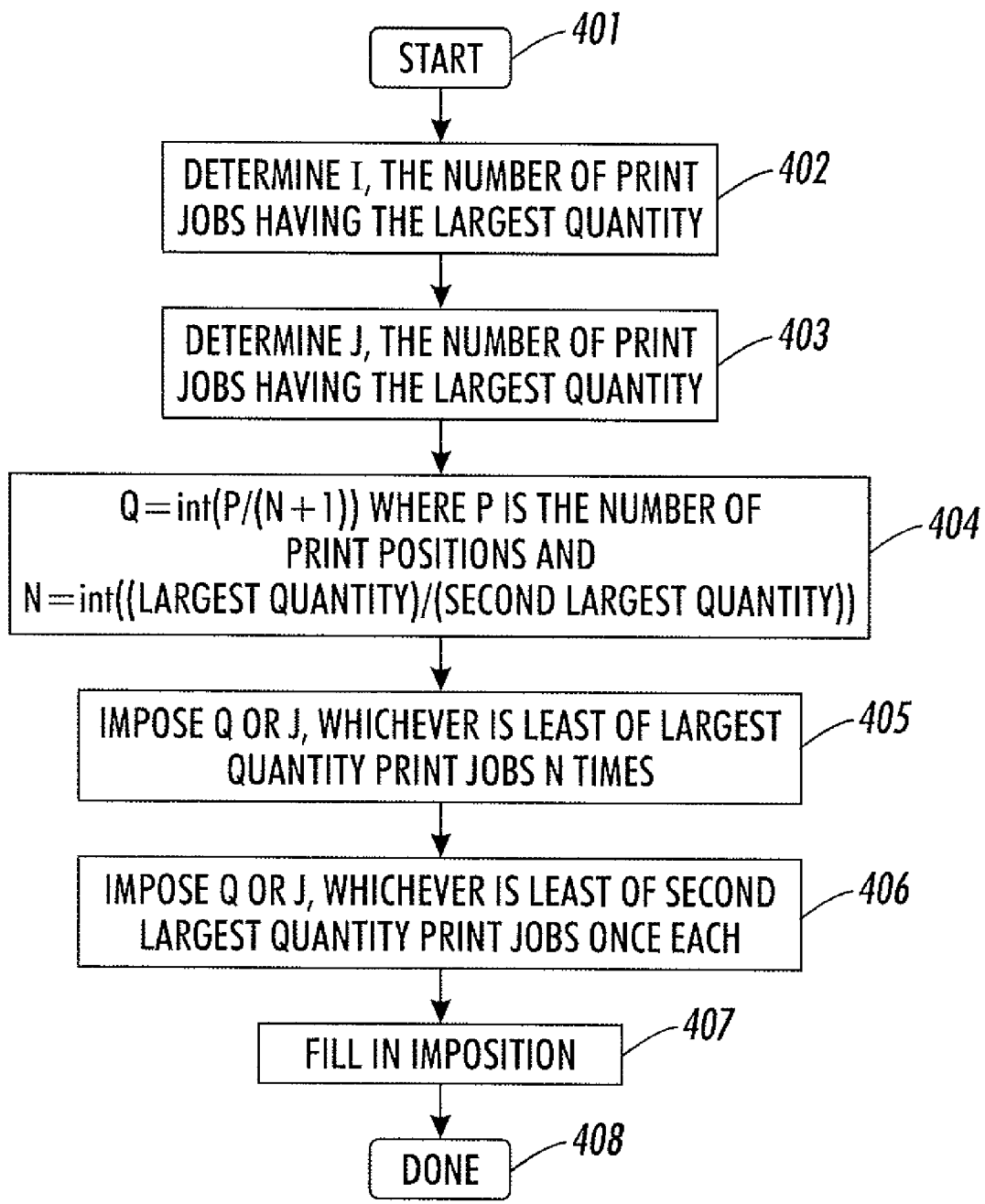
FIG. 4 illustrates a high level flow diagram of using quantity ratios to produce an imposition in accordance with aspects of certain embodiments.

FIG. 4 illustrates a high level flow diagram of using quantity ratios to produce an imposition in accordance with aspects of certain embodiments. After the start 401, the number of jobs having the largest quantity is determined and denoted with the variable "I" 402. Next, the number of jobs having the second largest quantity is determined and denoted with the variable "J" 403. The value of Q is the ratio of P to N+1 rounded down 404. P is the number of print positions in an imposition. N is the quantity ratio between the largest quantity and the second largest quantity rounded down. Consider an example with three print jobs having a print quantity of 300 and two print jobs having a print quantity of 100. Then I=3, J=2, N=300/100=3. If P=12, then Q=12/4=3.

Next, Q of the largest quantity jobs are added to the imposition N times unless Q is greater than I in which case only I of the largest quantity jobs are added 405. Returning to the example, Q=3 and I=3 so three of the 300 print quantity jobs are added to the imposition N, with N=3, times. Print positions 1-3 can be set to the first 300 print quantity job. Print positions 4-6 can be set to the second 300 print quantity job. Print positions 7-9 can be set to the third 300 print quantity job.

Q of the second largest quantity jobs are added to the imposition 1 time unless Q is greater than J in which case only J of the largest quantity jobs are added 406. Returning to the example, Q=3 and J=2 so two of the 100 print quantity jobs are added to the imposition. Print position 10 can be set to the first 100 print quantity job and print position 11 can be set to the second 100 print quantity job. Print position 12 is not yet filled in. As such, another print job can be used to fill in the imposition 407 before the process is done 408. Printing the imposition 100 times and then cutting the sheets into 12 pages results in printed product for all of the print jobs.

Figure 5:
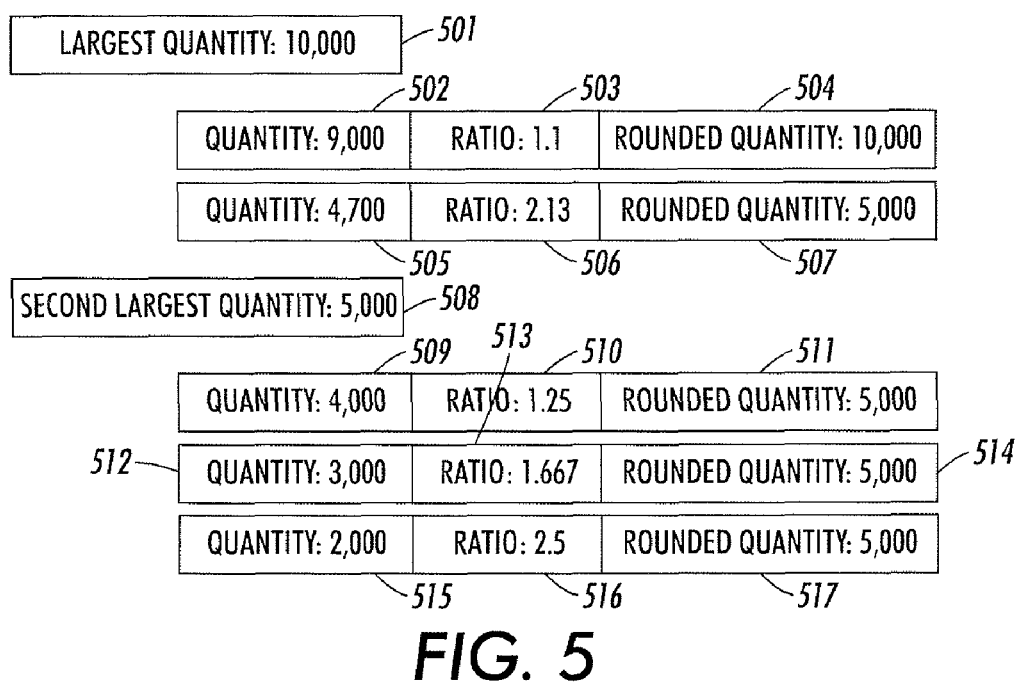
FIG. 5 illustrates a rounding process in accordance with aspects of certain embodiments.
Figure 6:
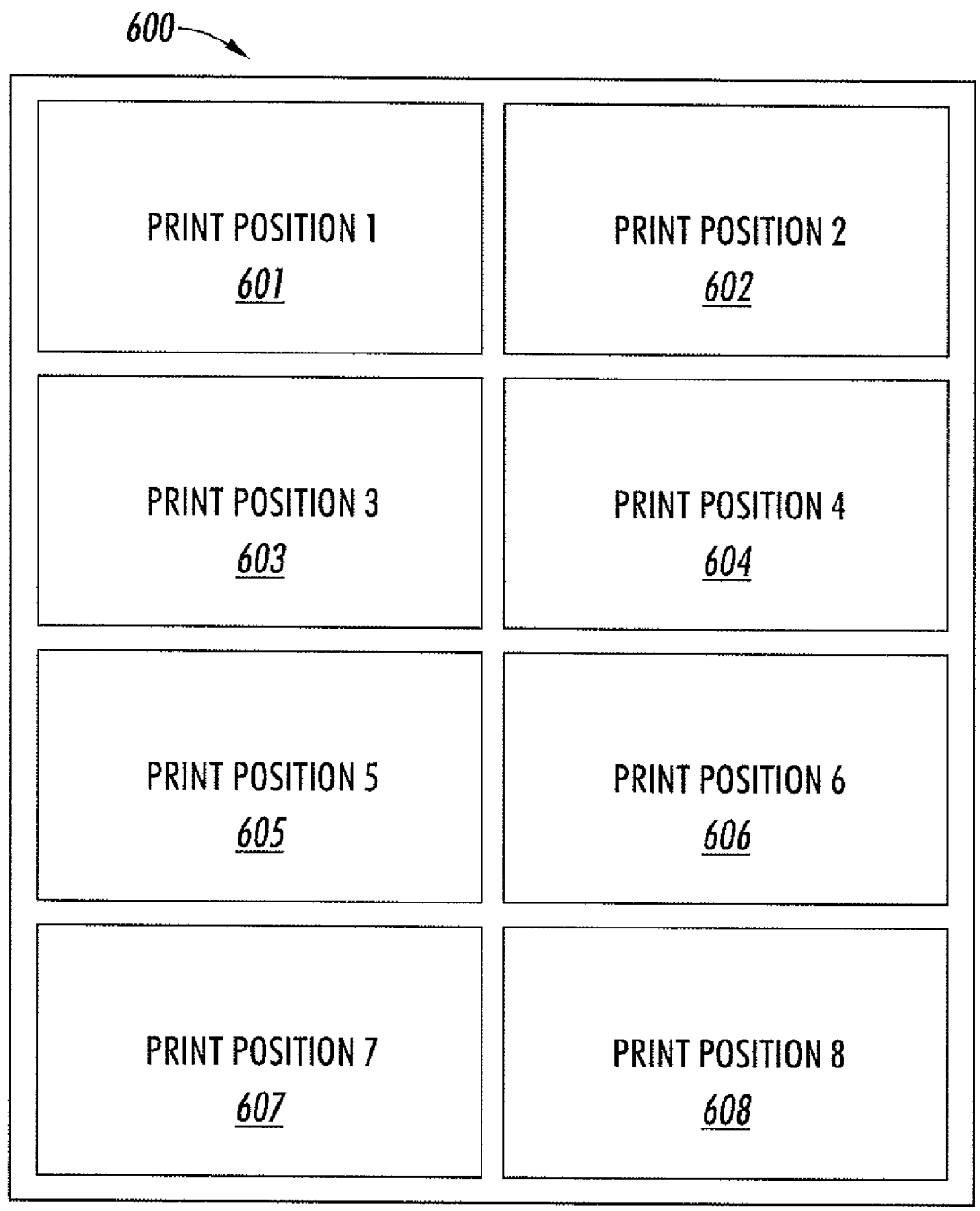
FIG. 6, labeled as "prior art", illustrates a sheet with eight different printing positions.
Figure 7:
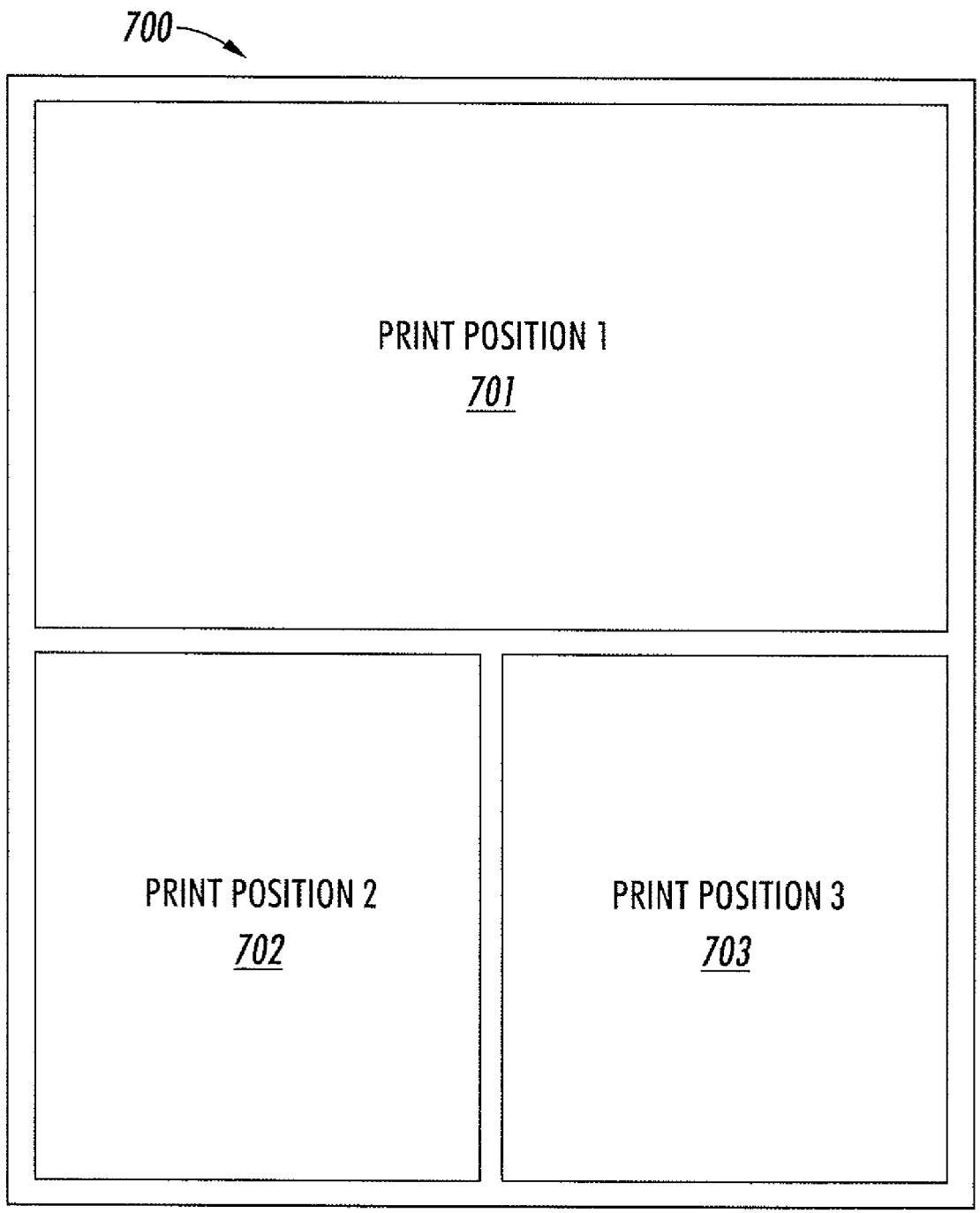
FIG. 7, labeled as "prior art", illustrates a sheet with three different printing positions.

FIG. 5 illustrates a rounding process in accordance with aspects of certain embodiments. In general, the process causes quantity ratios to become integers by increasing print quantities. The largest quantity is 10,000 501. The next largest quantity is 9,000 502 resulting a quantity ratio of 1.1 503. The quantity should be increased to cause the quantity ratio to be 1. As such, the rounded quantity is 10,000 504. The quantity 9,000 has been rounded to the largest quantity.

The next largest quantity is 4,700 505 having a quantity ratio of 2.13 506. A rounded quantity of 5,000 507 results in a quantity ratio of 2. The quantity 4,700 has been rounded to the largest quantity. A quantity ratio greater than 2 indicates that the second largest quantity has been found and rounding to the largest quantity should be stopped. The jobs can be rounded to the second largest quantity. Here, the second largest quantity is 5,000 508 and rounding to the second largest quantity means quantity ratios are calculated based on the second largest quantity.

The next largest quantity is 4,000 509 with a quantity ratio of 1.25 510 resulting in a rounded quantity of 5,000 511. The quantity of 3,000 512 with a quantity ratio of 1.667 513 results in a rounded quantity of 5,000 514. The quantity of 2,000 515 with a quantity ratio of 2.5 516 also results in a rounded quantity of 5,000 517.

Figure 8:
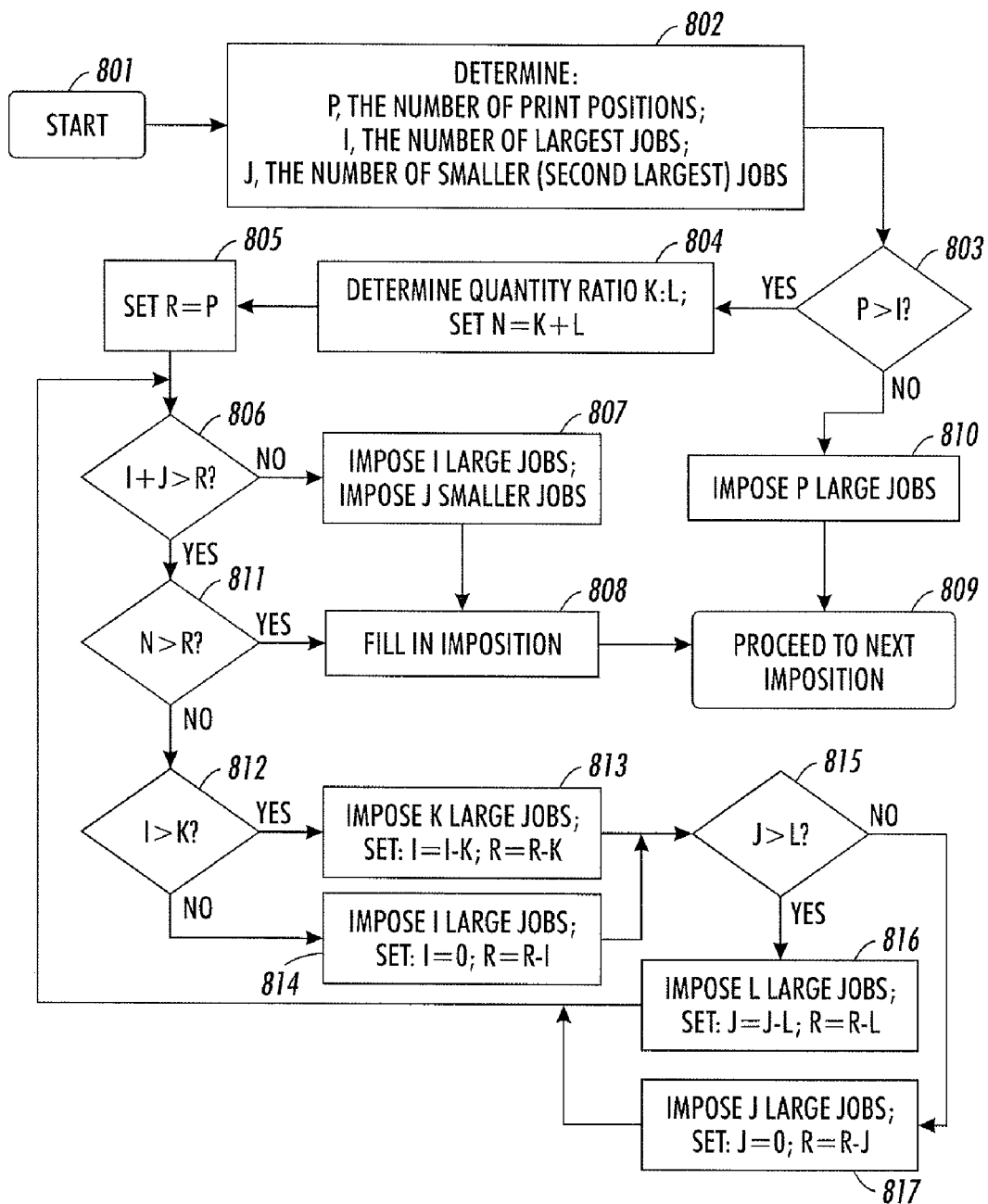
FIG. 8 illustrates a high level flow diagram of using an iterative algorithm to produce an imposition in accordance with aspects of some embodiments.

FIG. 8 illustrates a high level flow diagram of using an iterative algorithm to produce an imposition in accordance with aspects of some embodiments. After the start 801, the number of print positions, P, the number of jobs having the largest print quantity, I, and the number of jobs having the second largest print quantity, J, are determined 802. If P is not greater than I 803 then P of the highest quantity jobs are imposed 810 and the process proceeds to the next imposition 809. Otherwise, determine the quantity ratio, K:L and set N=K+L 804. The quantity ratio used here is the same as that discussed above with the exception that it is not divided out. For example, a quantity ratio expressed as 1:5 is divided out to yield the quantity ratio 1/5=0.2. The quantity ratio should be selected such that N is less than P, the number of print positions. Next, the number of remaining print positions, R, is set equal to P 805. If I+J is not greater than R 806 there are enough remaining print positions to impose the I largest jobs and the J smaller jobs 807, before the imposition is filled 808, and the process proceeds to the next imposition 809. Otherwise, if N is greater than R 811, then the imposition is filled 807 by some other heuristic before the process proceeds to the next imposition 809.

The imposition is filled 808 using some other heuristic when a quantity ratio based heuristic does not apply. The flow diagrams for FIG. 4 and FIG. 8 illustrate quantity ratio based heuristics. Another heuristic is fill the first available print position with the print pattern of the unassigned largest print quantity job and then iterate through the available print positions and unassigned jobs. In this manner, the R largest jobs get assigned in order of decreasing print quantity to the print positions. Those skilled in the art of imposition know of many other imposition filling heuristics that are not based on quantity ratios.

If R is not greater than N 811, then the process flows to another decision block. If I is greater than K 812 then K of the large jobs are imposed and the quantities I and R are decremented by K 813. Otherwise, I of the large jobs are imposed, I is set to 0 after R is decremented by I 814.

Next, if J is greater than L 815 then L of the smaller jobs are imposed and the quantities J and R are decremented by L 816. Otherwise, J of the smaller jobs are imposed, J is set to 0, and R is decremented by J 817. At this point, the process loops back to comparing I+J to R 806.

The process proceeds to the next imposition 809 when the current imposition is done. The current imposition is done when all the print positions are filled or when no print jobs remain. If no print jobs remain, then the process is truly complete because there is no remaining work. If print jobs do remain then more impositions can be produced by repeatedly iterating through the flow diagram of FIG. 8.

Embodiments can be implemented in the context of modules. In the computer programming arts, a module can be typically implemented as a collection of routines and data structures that performs particular tasks or implements a particular abstract data type. Modules generally can be composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. Thus, for example, the term module, as utilized herein generally refers to software modules, hardware modules, or implementations thereof. Such modules can be utilized separately or together to form a program product that can be implemented through signal-bearing media, including transmission media and recordable media.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer implemented method comprising:
   obtaining ganging criteria and also obtaining at least two print jobs wherein every print job comprises a quantity and a page size, and wherein every one of the at least two print jobs has the same page size;
   producing a combinable job set comprising at least two combinable jobs wherein each one of the combinable jobs is a print job meeting the ganging criteria;
   determine a number P wherein an imposition has P print positions;
   finding the quantity ratios of the combinable jobs;
   using the quantity ratios to determine an imposition pattern;
   combining the combinable jobs into a ganged job based on the imposition pattern, wherein said steps are instructions for a processor to execute and are stored on a non-transitory, tangible computer readable medium; and
   printing the ganged job to thereby print the combinable jobs.

2. The method of claim 1 wherein the quantity ratios compare the largest quantity to the second largest quantity and are expressed as K:L, wherein N=K+L, and wherein determining an imposition pattern comprises:
   determining I, and J wherein I is the number of jobs having the largest quantity, and wherein J is the number of jobs having the second largest quantity;
   imposing P of the largest quantity jobs unless P>I;
   setting R=P wherein R is the number of remaining print positions;
   imposing I of the largest quantity jobs and imposing J of the second largest quantity jobs unless I+J is greater than R;
   imposing as many of the largest quantity jobs as possible up to a maximum of K largest quantity jobs if I+J is greater than R;
   imposing as many of the second largest quantity jobs as possible up to a maximum of J second largest quantity jobs if I+J is greater than R;
   decrementing R, I and J based on the number of imposed jobs; and determining an imposition pattern for the R remaining print positions.

3. The method of claim 1 wherein the ganging criteria comprises a substrate specification.

4. The method of claim 1 further comprising rounding to the largest quantity and then rounding to the second largest quantity.

5. The method of claim 1 wherein the quantity ratio is expressed as a fraction, N, wherein N equals the largest quantity divided by the second largest quantity rounded down, and wherein determining an imposition pattern comprises:
 determining I wherein I is the number of the print jobs with a largest quantity;
 determining J wherein J is the number of the print jobs with a second largest quantity;
 determining Q wherein Q is the ratio of P to N+1 and wherein Q is rounded down;
 imposing Q or I, whichever is least, of the largest quantity print jobs N times and removing the imposed print jobs from the combinable job set;
 imposing Q or J, whichever is least, of the second largest quantity jobs 1 time and removing the imposed print jobs from the combinable job set; and
 filling in the imposition pattern with other print jobs from the combinable job and removing the imposed print jobs from the combinable job set.

6. The method of claim 5 wherein the ganging criteria comprises a marking solution color.

7. The method of claim 5 wherein the ganging criteria comprises a substrate specification.

8. The method of claim 5 further comprising rounding to the largest quantity and then rounding to the second largest quantity.

9. A computer implemented method comprising:
 obtaining ganging criteria and also obtaining at least two print jobs wherein every print job comprises a quantity and a page size;
 producing a combinable job set comprising at least two combinable jobs wherein each one of the combinable jobs is a print job meeting the ganging criteria;
 determine a number P wherein an imposition has P print positions;
 finding the quantity ratios of the combinable jobs;
 using the quantity ratios to determine an imposition pattern;
 combining the combinable jobs into a ganged job based on the imposition pattern wherein said steps are instructions for a processor to execute and are stored on a non-transitory, tangible computer readable medium; and
 printing the ganged job to thereby print the combinable jobs.

10. The method of claim 9 wherein the quantity ratios compare the largest quantity to the second largest quantity and are expressed as K:L, wherein N=K+L, and wherein determining an imposition pattern comprises:
 determining I, and J wherein I is the number of jobs having the largest quantity, and wherein J is the number of jobs having the second largest quantity;
 imposing P of the largest quantity jobs unless P>I;
 setting R=P wherein R is the number of remaining print positions;
 imposing I of the largest quantity jobs and imposing J of the second largest quantity jobs unless I+J is greater than R;
 imposing as many of the largest quantity jobs as possible up to a maximum of K largest quantity jobs if I+J is greater than R;
 imposing as many of the second largest quantity jobs as possible up to a maximum of J second largest quantity jobs if I+J is greater than R;
decrementing R, I and J based on the number of imposed jobs; and
 determining an imposition pattern for the R remaining print positions.

11. The method of claim 9 wherein the ganging criteria comprises a maximum quantity ratio.

12. The method of claim 9 further comprising rounding to the largest quantity and then rounding to the second largest quantity.

13. The method of claim 1 wherein the quantity ratio is expressed as a fraction, N, wherein N equals the largest quantity divided by the second largest quantity rounded down, and wherein determining an imposition pattern comprises:
 determining I wherein I is the number of the print jobs with a largest quantity;
 determining J wherein J is the number of the print jobs with a second largest quantity;
 determining Q wherein Q is the ratio of P to N+1 and wherein Q is rounded down;
 adding Q or I, whichever is least, of the largest quantity print jobs N times to the imposition pattern and removing the imposed print jobs from the combinable job set;
 adding Q or J, whichever is least, of the second largest quantity jobs 1 time to the imposition pattern and removing the imposed print jobs from the combinable job set; and
 filling in the imposition pattern with other print jobs from the combinable job and removing the imposed print jobs from the combinable job set.

14. The method of claim 13 wherein the ganging criteria comprises a marking solution color.

15. The method of claim 13 wherein the ganging criteria comprises a substrate specification.

16. The method of claim 13 further comprising rounding to the largest quantity and then rounding to the second largest quantity.

17. The method of claim 16 wherein the ganging criteria comprises a marking solution color and wherein the ganging criteria comprises a substrate specification.

18. A system comprising:
 a marking engine that prints at least one ganged job to produce output wherein a ganged job comprises an imposition and a plurality of a print jobs wherein each of the print jobs has a print quantity and wherein every imposition comprises P print positions;
 a bindery that accepts the output of the marking engine and produces a printed product by cutting, collating, folding, and fastening in accordance with a finishing specification;
 a machine-implemented imposition module that accepts the plurality of print jobs and a ganging criteria wherein the machine-implemented imposition module uses the ganging criteria to produce the at least one ganged job, wherein the ganging criteria are selected to reduce a bindery cost, and wherein every print job comprises the print quantity and a print pattern.

19. A system comprising:
 a marking engine that prints at least one ganged job to produce output wherein a ganged job comprises a plurality of print jobs wherein each of the print jobs has a print job quantity and an imposition and wherein every imposition comprises P print positions;

a bindery that accepts the output of the marking engine and produces a printed product by cutting, collating, folding, and fastening in accordance with a finishing specification;

a machine-implemented imposition module that accepts the plurality of print jobs and a ganging criteria wherein the imposition module uses the ganging criteria to produce the at least one ganged job, wherein the ganging criteria are selected to reduce a bindery cost, wherein every print job comprises the print job quantity and a print pattern, and wherein the machine-implemented imposition module accepts a multitude of print jobs meeting the ganging criteria and produces a new job wherein:

the multitude of print jobs comprises I print jobs with a largest quantity and J print jobs with a second largest quantity;

N is the quantity ratio of the largest quantity to the second largest quantity and Q is the ratio of P to N+1 rounded down;

The imposition of the new job comprises Q or I, whichever is greater, of the print patterns of the largest quantity print jobs N times; and the imposition of the new job comprises Q or J, whichever is greater, of the print patterns of the second largest quantity jobs 1 time;

the job quantity of the new job equals the second largest quantity.

20. The system of claim 19 wherein every one of the multitude of print jobs has a quantity that is rounded based on the largest quantity.

* * * * *